Patented Oct. 22, 1929

1,732,409

UNITED STATES PATENT OFFICE

CHAUNCEY C. LOOMIS, OF YONKERS, AND ALEXANDER DONALD MACDONALD, OF HASTINGS-ON-HUDSON, NEW YORK, ASSIGNORS TO COLLOIDAL LIME PLASTER CORPORATION, OF NEW YORK, N. Y., A CORPORATION OF DELAWARE

QUICK-SETTING LIME PRODUCT AND METHOD OF MAKING THE SAME

No Drawing.  Application filed April 5, 1926. Serial No. 99,963.

This invention relates to lime products adapted for the preparation of plastic putty or paste for various uses such as plaster, mortar, cement and the like. Among the principal objects of the invention is the provision of a lime-containing product of this type which is exceptionally quick setting and which does not possess the disadvantages of the so-called quick setting lime products hitherto known.

We are aware that prior to the present invention attempts have been made to prepare quick setting lime products by mixing gypsum frequently in combination with so-called retarders, with ordinary quick lime or with hydrated lime and also more recently by partially carbonating hydrated lime with carbon dioxide gas, but these products possess certain disadvantages which render their use unsatisfactory in actual practice, such as low sand-carrying capacity, unsatisfactory workability under trowel, lack of strength after setting, a tendency to corrode metal laths, excessive shrinkage after coating or other similar objectionable characteristics possessed, either singly or in combination by the several products.

The improved lime product of the present invention is substantially free from these objectionable properties. Furthermore it possesses certain advantages over retarded gypsum plasters, pure quick lime or pure hydrated lime plasters when these are used alone, since it combines to a considerable degree many of the desirable properties of each of these products without exhibiting any of their more pronounced undesirable characteristics. Thus the improved product in some of its forms has quick setting qualities approaching or equalling those of retarded gypsum putties or plasters and yet at the same time it possesses a workability under the trowel substantially equal to that of high grade quick lime plaster. The new product also possesses a sand-carrying capacity similar to that of quick lime plaster and yet at the same time is subject to less shrinkage after coating than the latter. In comparison with hydrated lime plasters the improved product has many advantages particularly with respect to quick setting properties, shrinkage, strength, and workability.

Various other advantages and objects of our invention will appear more fully from the following example which is given as an illustration or embodiment of our invention, it being understood that we do not restrict ourselves to the specific details set forth in the example but that these may be varied without departing from the true scope of our invention as set forth in the appended claims.

*Example.*—112 pounds of quick lime containing approximately 95 percent calcium oxide is ground to a degree of fineness such that substantially all of it will pass a 50 mesh sieve. This ground or comminuted quick lime is next placed in a rotary kiln through which hot lime kiln gas containing ordinarily from 15 to 30 percent by volume of carbon dioxide is passed, care being taken that the gas comes into intimate contact with and passes over the surface of the particles or lumps of the comminuted lime. The kiln gas preferably should be sufficiently hot to maintain the lime particles at a temperature between about 600° and 700° C. during the process. The contact between the gas and the particles is maintained until the individual particles have absorbed on an average about 20 to 25 percent by weight of carbon dioxide as indicated by the increase in weight of the mass. The heat liberated by the reaction between the quick lime and the carbon dioxide assists in maintaining the temperature at the elevated temperature specified in this particular example. If necessary heat is applied externally to the rotary kiln to keep the temperature at this range. The process may be carried out continuously by tipping the kiln slightly at an angle so that the lime flows through the kiln at such a rate that it is carbonated to the desired degree during its passage through the kiln.

Micro chemical examination of the product thus obtained under a low power microscope shows, after crushing the particles, that they are composed principally of an inner core of quick lime and an outer portion or shell of lime carbonate. In carrying out this micro chemical examination the crushed particles are treated with dilute acid solution which liberates carbon dioxide gas from the portions of the particles containing calcium carbonate, the results showing that the carbonate is located mainly in the outer portions of the particles in the form of a shell surrounding an interior portion or core of quick lime. Other suitable micro chemical tests show the same structure and composition.

The product is further characterized by a slow rate of slacking as compared with that of ordinary quick lime or dolomitic quick lime in proportion to the calcium oxide present and this is accompanied by a corresponding slow rate of liberation of heat when slacked with water such that during the first thirty minutes after adding the water a total amount of heat is evolved which is substantially less than that produced in the same period from the slacking of dolomitic quick lime in proportion to the amount of calcium oxide present in the two cases.

This characteristic property of our improved lime product referred to in the preceding paragraph we have designated the "initial thirty minute slacking heat". This property is susceptible of quantitative measurement and enables one to determine in many instances whether a given product is substantially identical with the product of the present invention. In carrying out such a quantitative measurement of the property in question, a determination is first made of the calcium oxide content of the sample to be tested. A weighed quantity of the product is then admixed with water in the proportion of one part by weight of water to each part by weight of calcium oxide present in the sample and the total amount of heat evolved during the thirty minute period after the addition of the water is measured in any suitable manner as by means of a suitable calorimeter. This heat may frequently be measured with sufficient accuracy for the purposes of this test by admixing the water and lime in a beaker and determining the heat evolved by noting the rise of temperature of the water, taking into account the mass of water present. In either case an entirely similar measurement is made upon dolomitic quick lime of definite composition as a standard for comparison and the conditions arranged so that the heat lost by radiation is substantially the same in the two cases. The total heat evolved in the thirty minute period is divided by the number of pounds of calcium oxide present in the sample or standard and the result taken as the "initial thirty minute slacking heat". Dolomitic quick lime containing between 35 percent and 45 percent by weight magnesium oxide is used as the standard of comparison.

The initial thirty minute slacking heat of our improved product determined as described in the preceding paragraphs will vary according to the degree of carbonation of the comminuted quick lime and also with the density, porosity and other properties of the quick lime employed in our process, but it will ordinarily amount to less than $\frac{1}{10}$ of that of the standard dolomitic lime stone specified, i. e. dolomitic quick lime containing between 35 percent and 45 percent by weight of magnesium oxide.

In making the above described measurement of the initial thirty minute slacking heat the sample tested and the standard dolomitic quick lime taken as a standard of comparison should both be crushed or comminuted to substantially the same degree of fineness or state of subdivision or comminution and the conditions of measurement otherwise made substantially identical in the two cases.

We have discovered that this initial thirty minute slacking heat per pound of calcium oxide is a rough measure of the quick setting properties of the product in the sense that the product having a relatively low initial thirty minute slacking heat per pound of calcium oxide will set in a relatively shorter period of time.

As previously indicated, the specific details as set forth in the example may be varied considerably without departing from the true scope of our invention, depending upon the character of the quick lime to be treated in each particular case and also upon the use to which the finished product is to be put and upon various other considerations.

Thus the amount of carbon dioxide absorbed by the quick lime may be varied between about 3 percent and about 40 percent by weight according to the results desired and the temperature may vary between about 500° C. and 850° C. although the middle range specified in the example is preferred. So also gases of widely varying carbon dioxide content may be utilized for carbonating the lime. The degree of comminution of the quick lime may also be varied although no substantial proportion of the quick lime particles should be larger than about $\frac{1}{5}$ of an inch in diameter since we have found that these cause "popping" of the dried plaster.

We have also discovered that sulphur dioxide may be used as the fluid re-agent instead of carbon dioxide and also that fluid sulphur either in the vapor or liquid state may be employed for this same purpose. It will be evident, however, that when the latter re-agent is employed, the conditions of treatment must be altered to adapt them to the known properties of gaseous or liquid sulphur. The products obtained with sulphur dioxide gas or with fluid sulphur or similar re-agents are not so satisfactory however as those obtained with carbon dioxide gas and we therefore prefer to employ the latter re-agent.

We have found that the partially carbonated quick lime products described above may be mixed with ordinary quick lime or hydrate of lime or both, with advantageous results for many purposes. In preparing such mixtures we prefer to employ about 40 parts by weight of the partially carbonated granular product of the above example to 60 parts by weight of quick lime or hydrated lime but an improved quick setting lime is obtained even when as little as 10 percent by weight of the partially carbonated quick lime product is present in the mixture.

We have found also that Portland cement, gypsum, or hair or any combination of these may be advantageously admixed with any of the above described products, prior to shipment and that these mixtures may be stored under proper conditions for reasonable periods of time without objectionable deterioration.

In using our improved lime products after preparing the putty in the usual manner, it should be troweled or worked into place for setting and permitted to dry before the water in the putty has sufficient time in which to penetrate the outer insoluble shells of the particles of carbonated quick lime thereby converting the latter into hydrated lime, since if this is allowed to happen many of the most desirable properties of the product are adversely affected or entirely destroyed.

It will be observed that the increase in weight of the quick lime due to the combination of the carbon dioxide therewith, between the limits above specified (i. e. 3 percent to 40 percent of the original weight of the quick lime treated), corresponds approximately to a range of from about seven hundredths (0.07) to about one and eighty five hundredths (1.85) parts by weight of calcium carbonate or lime carbonate to each part by weight of anhydrous calcium oxide or quick lime.

We claim:

1. The method of processing quick lime which comprises partially carbonating the quick lime by bringing it into intimate contact with carbon dioxide, the quick lime being in a state of comminution such that substantially all of it will pass through a sieve of five meshes to the inch, the carbonation being continued until the increase in weight due to carbonation is not less than about 3% and not more than about 40% of the original weight of the quick lime before carbonation.

2. The method of processing quick lime which comprises partially carbonating the quick lime by bringing it into intimate contact with carbon dioxide. the quick lime being in a state of subdivision such that substantially all of it will pass through a sieve having five meshes to the inch, the carbonation being continued until the increase in weight of the lime due to the carbonation amounts to between 20% and 25% of the original weight of the quick lime.

3. The method of processing quick lime which comprises partially converting the quick lime into insoluble lime compounds by bringing it into intimate contact with a gas containing carbon dioxide, the quick lime being in a state of subdivision such that substantially all of it will pass through a sieve having five meshes per inch, and the said conversion of the quick lime into the insoluble lime compounds being discontinued before more than about half of the quick lime has been converted into the insoluble lime compound.

4. The method of processing quick lime which comprises partially converting the quick lime into insoluble lime carbonate by bringing the quick lime into intimate contact with carbon dioxide, the quick lime being in a state of subdivision such that substantially all of it will pass through a sieve having five meshes per inch, and the said conversion of the quick lime into insoluble lime carbonate being discontinued before more than one-half of the quick lime has been thus converted into insoluble lime carbonate.

5. A quick-setting lime composition comprising comminuted lime the particles of which are composed of quick lime and lime carbonate in the proportion of between about 0.466 and about 1.156 parts by weight of lime carbonate to each part by weight of quick lime, the degree of comminution or subdivision of the comminuted lime being such that substantially all of it will pass a screen having five meshes per inch.

6. A quick-setting lime composition comprising comminuted lime the particles of which are composed of quick lime and lime carbonate in the proportion of between about 0.466 and about 1.156 parts by weight of lime carbonate to each part by weight of quick lime, the degree of comminution or subdivision of the comminuted lime being such that substantially all of it will pass a screen having five meshes per inch, and hydrated lime in the proportion of between 1/9 and 4/9 parts by weight of the partially hydrated comminuted lime to each part by weight of hydrated lime.

In testimony whereof we affix our signatures.

CHAUNCEY C. LOOMIS.
ALEXANDER DONALD MACDONALD.